US007716661B2

(12) United States Patent
Paul et al.

(10) Patent No.: US 7,716,661 B2
(45) Date of Patent: May 11, 2010

(54) EMBEDDED DEVICE UPDATE SERVICE

(75) Inventors: Jeffrey Michael Paul, Kirkland, WA (US); Yuguo Liu, Woodinville, WA (US); Donghoon Park, Sammamish, WA (US); Raymond Robert O'Brien, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1070 days.

(21) Appl. No.: 11/082,441

(22) Filed: Mar. 16, 2005

(65) Prior Publication Data

US 2006/0230395 A1 Oct. 12, 2006

(51) Int. Cl.
*G06F 9/44* (2006.01)
*G06F 9/445* (2006.01)

(52) U.S. Cl. .................... 717/173; 717/168; 717/174

(58) Field of Classification Search ............... 717/173, 717/178
See application file for complete search history.

(56) References Cited

U.S. PATENT DOCUMENTS

| | | | | |
|---|---|---|---|---|
| 6,052,531 | A * | 4/2000 | Waldin et al. ............. 717/170 |
| 6,157,559 | A * | 12/2000 | Yoo ........................... 365/52 |
| 6,163,274 | A * | 12/2000 | Lindgren ................... 340/7.29 |
| 6,198,946 | B1 * | 3/2001 | Shin et al. .................. 455/561 |
| 6,651,249 | B2 * | 11/2003 | Waldin et al. ............. 717/170 |
| 6,687,901 | B1 * | 2/2004 | Imamatsu ................... 717/173 |
| 6,832,373 | B2 * | 12/2004 | O'Neill ..................... 717/171 |
| 7,035,635 | B2 * | 4/2006 | Papoutsis et al. ........ 455/432.2 |
| 7,080,371 | B1 * | 7/2006 | Arnaiz et al. .............. 717/170 |
| 7,185,332 | B1 * | 2/2007 | Waldin et al. ............. 717/170 |
| 7,530,065 | B1 * | 5/2009 | Ciudad et al. ............. 717/174 |
| 7,568,195 | B2 * | 7/2009 | Markley et al. .......... 717/175 |
| 2001/0029178 | A1 * | 10/2001 | Criss et al. ................. 455/419 |
| 2001/0047363 | A1 * | 11/2001 | Peng ....................... 707/104.1 |
| 2001/0048728 | A1 * | 12/2001 | Peng ......................... 375/354 |
| 2002/0078209 | A1 * | 6/2002 | Peng ......................... 709/227 |
| 2002/0099726 | A1 * | 7/2002 | Crudele et al. ............. 707/200 |
| 2003/0060240 | A1 * | 3/2003 | Graham et al. ............. 455/566 |
| 2003/0070162 | A1 * | 4/2003 | Oshima et al. ............. 717/171 |
| 2003/0177485 | A1 * | 9/2003 | Waldin et al. ............. 717/169 |

(Continued)

OTHER PUBLICATIONS

Jing, "Client-Sever Computing in Mobile Environments", Jun. 1999, ACM, vol. 31, No. 2,41 pages, retrieved from <http://delivery.acm.org/10.1145/320000/319814/p117-jing.pdf?key1=319814&key2=6891711621&coll=GUIDE&dl=GUIDE&CFID=67317227&CFTOKEN=27640829>.*

(Continued)

*Primary Examiner*—Michael J Yigdall
*Assistant Examiner*—Marina Lee
(74) *Attorney, Agent, or Firm*—Merchant & Gould; Ryan T. Grace

(57) ABSTRACT

A method and system for updating an OS of an embedded device. The embedded device provides its current OS version information to a mobile operation network via a SMS message. The embedded device can provide its current OS version information to a mobile operation network in response to a request from a mobile operator network that has implemented the SyncML specifications promulgated by the Open Mobile Alliance (OMA). The mobile operator network interacts with the datacenter to provide the embedded devices's current OS version and get the address of the image update. The mobile operator service sends the address to the embedded device via another SMS message. The embedded device downloads the image update using the RF link via a global packet radio service (GPRS) connection.

16 Claims, 9 Drawing Sheets

U.S. PATENT DOCUMENTS

| | | | |
|---|---|---|---|
| 2003/0182414 A1* | 9/2003 | O'Neill | 709/223 |
| 2004/0215755 A1* | 10/2004 | O'Neill | 709/223 |
| 2004/0250245 A1* | 12/2004 | Rao et al. | 717/168 |
| 2004/0261072 A1* | 12/2004 | Herle | 717/171 |
| 2004/0261073 A1* | 12/2004 | Herle et al. | 717/173 |
| 2005/0010913 A1* | 1/2005 | Chen | 717/168 |
| 2005/0039178 A1* | 2/2005 | Marolia et al. | 717/168 |
| 2005/0166199 A1* | 7/2005 | Willis | 717/173 |
| 2005/0203968 A1* | 9/2005 | Dehghan et al. | 707/203 |
| 2006/0168574 A1* | 7/2006 | Giannini et al. | 717/168 |
| 2007/0028226 A1* | 2/2007 | Chen et al. | 717/168 |
| 2007/0169073 A1* | 7/2007 | O'Neill et al. | 717/168 |
| 2007/0220504 A1* | 9/2007 | Eker | 717/168 |

OTHER PUBLICATIONS

"*MDS Web Services*"; Feb. 15, 2005; pp. 1-12.
"*SyncML OBEX Binding*"; Candidate Version 1.2—Jun. 1, 2004; 29 pgs.
"*Enabler Release Definition for SyncML Common Specifications*"; Candidate Version 1.2—Jun. 1, 2004; 13 pgs.
"*SyncML HTTP Binding*"; Candidate Version 1.2—Jun. 1, 2004; 23 pgs.
"*SyncML Meta Information*"; Candidate Version 1.2—Jun. 1, 2004; 24 pgs.

* cited by examiner

CANONICAL UPDATES

VERSION 3

VERSION 5

VERSION 6

— 602

DIFFERENCE UPDATES

VERSION 1 → VERSION 3
VERSION 2 → VERSION 4
VERSION 3 → VERSION 8
VERSION 4 → VERSION 5
VERSION 5 → VERSION 6
VERSION 6 → VERSION 7
VERSION 7 → VERSION 8

| 702 | 704 |
| --- | --- |
| ID (UUID) | Metadata (XML) |
| xxxxxx1234 | \<tag 1\> ••• \</tag 1\><br>\<tag 2\> ••• \</tag 2\><br>•<br>•<br>•<br>\<extended metadata\> •••<br>\</extended metadata\> |
| xxxxxx1235 | \<tag 1\> ••• \</tag 1\><br>\<tag 2\> ••• \</tag 2\><br>•<br>•<br>•<br>\<extend metadata\> •••<br>\</extended metadata\> |

*Fig. 7*

EMBEDDED DEVICE UPDATE SERVICE

BACKGROUND

Portable communication and/or computing devices ("mobile devices") can often be linked to various networks. For example, cell phones can be used to browse web sites offered through the Internet. Additionally, some cell phones can send and receive text messages in addition to offering normal voice communications using an RF communications link. Further, some cell phones can receive and store data such as ring tones and themes (e.g., for user interfaces) via their RF communications link.

Some mobile devices have flash memory in which an operating system (OS) to be executed by a processor is stored. The mobile device may execute the OS directly from the flash memory (i.e., an image of the OS stored in the flash memory). Such mobile devices are also referred to herein as "embedded devices". An OS provider may update an OS from time-to-time to incorporate new features (e.g., security features) or correct "bugs". However, updating an OS (also referred to herein as an "image update") on an embedded device can be burdensome due to limitations inherent in embedded devices and the way they are typically used.

SUMMARY

Embodiments of the present invention have aspects directed toward systems and methods to provide image updates to embedded devices. According to one aspect, a computer-implemented method for providing an image update to an embedded device includes providing the embedded device's current OS version information to a datacenter, which then determines the information needed to update the embedded device's OS to a later or desired version. The datacenter then provides an address from which the embedded device can download the needed update information.

According to another aspect, the embedded device can provide its current OS version information to a mobile operation network via a SMS message. The mobile operator network can then interact with the datacenter to provide the embedded device's current OS version and get the address of the image update. The mobile operator service can then send the address to the embedded device via another SMS message. The embedded device can then download the image update using the RF link via a global packet radio service (GPRS) connection.

According to another aspect, the embedded device can provide its current OS version information to a mobile operation network in response to a request from a mobile operator network that has implemented the SyncML specifications promulgated by the Open Mobile Alliance (OMA). For example, the mobile operator network may include an OMA Device Management Server (OMA-DMS) that supports OMA SyncML operation, with the embedded device having a corresponding OMA-DMS client. The mobile operator network can then interact with the datacenter to provide the embedded device's current OS version and get the address of the image update. The mobile operator service can then send the address to the embedded device via a SMS message. The embedded device can then download the image update from the datacenter using the RF link via a global packet radio service (GPRS) connection.

In another aspect, the datacenter includes a network interface implemented according to a web services model. As well as providing an interface to an external network (e.g., the mobile operator network), the web services can include or use APIs that support secure transfer of update information between the external network and update information stored in the datacenter.

In another aspect, the datacenter generates an optimal image update based on the embedded device's current OS version and newer updates stored in the datacenter. The datacenter can determine a combination of canonical and difference updates that reduce the total size of the image update package.

In another aspect, update information is stored in a database having tables with a column containing XML metadata that specifies interrelationships between a particular update and other updates stored in the database. The XML metadata column includes an extended metadata field that can be used to add more relationships as more updates are created and added to the database.

In another aspect, the embedded device can provide its current OS version information to and download an image update from the datacenter via a network connection like the Internet. For example, the embedded device can make an Internet connection through a link with a computer that can connect to the Internet. The datacenter can present a list of updates from which the user can select. The datacenter then provides the image update to the embedded device via the Internet and the computer linked to the embedded device.

In accordance with the above aspects, a user may easily update the OS of an embedded device using an RF, Internet or other communication link.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is a diagram illustrating canonical updates and difference updates, according to an exemplary embodiment of the present invention.

FIG. 7 is a diagram illustrating a data structure for storing updates, according to an exemplary embodiment of the present invention.

DETAILED DESCRIPTION OF ILLUSTRATED EMBODIMENTS

Embodiments of the present invention are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments of the present invention may be practiced as methods, systems or devices. Accordingly, embodiments of the present invention may take the form of an entirely hardware implementation, an entirely software implementation or an implementation combining software and hardware aspects. The following detailed description is, therefore, not to be taken in a limiting sense.

Figure 1:
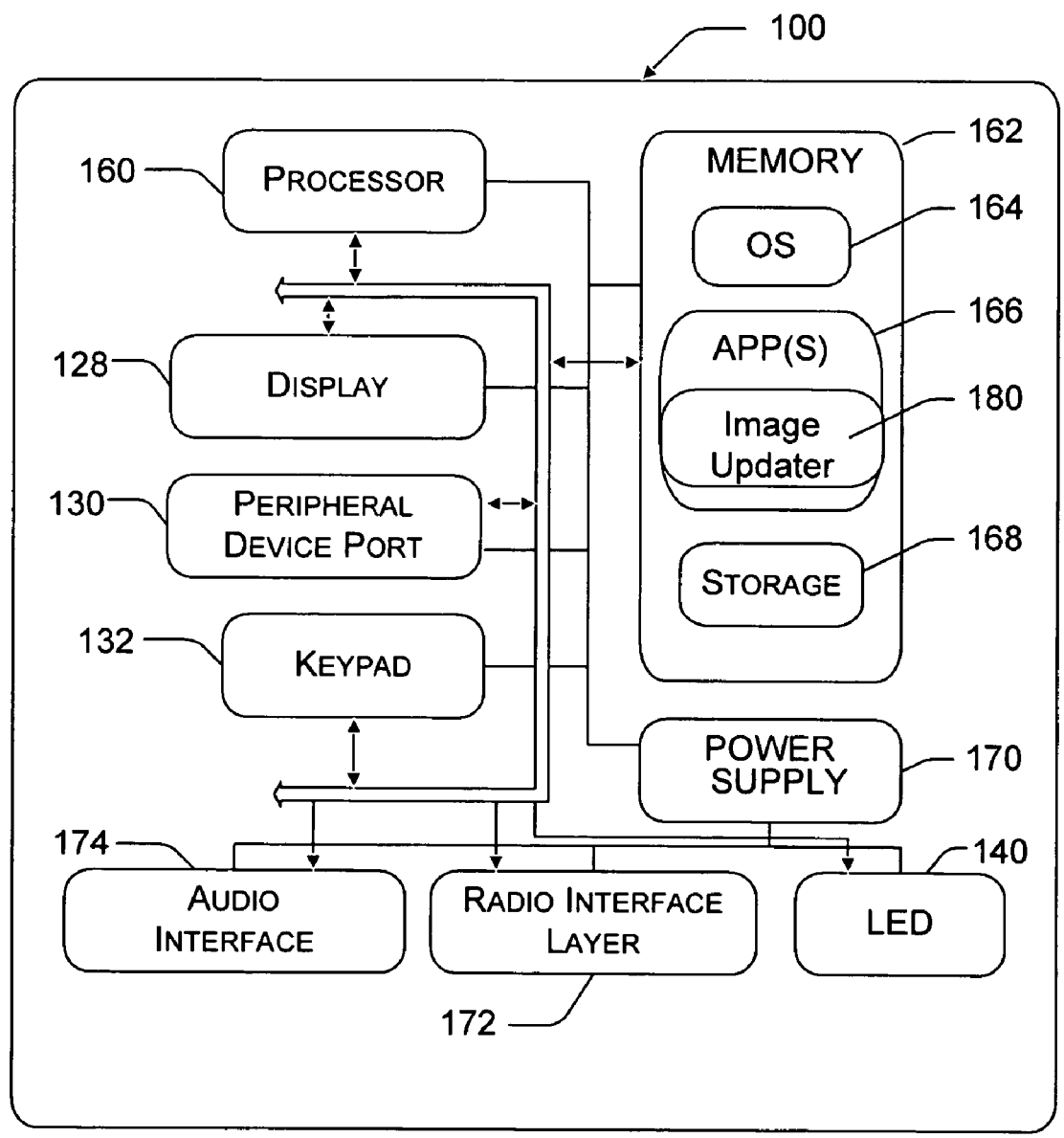
FIG. 1 is a block diagram illustrating an exemplary mobile device that may be used according to an exemplary embodiment of the present invention.

FIG. 1 illustrates an embedded device 100 for use in or with some embodiments of the present invention. For example, embedded device 100 can be a "smart phone" that can run one or more applications similar to those of a desktop or notebook computer such as, for example, browser, email, scheduling, instant messaging, and media player applications. Embedded device 100 typically executes an OS such as Windows Mobile 2003 or Windows CE. In some embodiments, embedded device 100 is integrated as a computing device, such as an integrated personal digital assistant (PDA) and wireless phone.

In this embodiment, embedded device 100 has a processor 160, a memory 162, a display 128, and a keypad 132. Memory 162 generally includes both volatile memory (e.g., RAM) and non-volatile memory (e.g., ROM, Flash Memory, or the like). Embedded device 100 includes an operating system 164, which in this embodiment is resident in a flash memory portion of memory 162 and executes on processor 160. Keypad 132 may be a push button numeric dialing pad (such as on a typical telephone), a multi-key keyboard (such as a conventional keyboard), or may not be included in the mobile device in deference to a touch screen or stylus. Display 128 may be a liquid crystal display, or any other type of display commonly used in mobile computing devices. Display 128 may be touch-sensitive, and would then also act as an input device.

One or more application programs 166 are loaded into memory 162 and run on operating system 164. Examples of application programs include phone dialer programs, e-mail programs, scheduling programs, PIM (personal information management) programs, word processing programs, spreadsheet programs, Internet browser programs, and so forth. In one embodiment, application programs 166 include an image update application 180. Embedded device 100 also includes non-volatile storage 168 within the memory 162. Non-volatile storage 168 may be used to store persistent information that should not be lost if embedded device 100 is powered down. The applications 166 may use and store information in storage 168, such as e-mail or other messages used by an e-mail application, contact information used by a PIM, appointment information used by a scheduling program, documents used by a word processing application, and the like. A synchronization application (not shown) also resides on the mobile device and is programmed to interact with a corresponding synchronization application resident on a host computer to keep the information stored in the storage 168 synchronized with corresponding information stored at the host computer. In some embodiments, storage 168 includes the aforementioned flash memory in which the OS (and possibly other software) is stored.

Embedded device 100 has a power supply 170, which may be implemented as one or more batteries. Power supply 170 might further include an external power source, such as an AC adapter or a powered docking cradle that supplements or recharges the batteries.

Embedded device 100 is also shown with two types of external notification mechanisms: an LED 140 and an audio interface 174. These devices may be directly coupled to power supply 170 so that when activated, they remain on for a duration dictated by the notification mechanism even though processor 160 and other components might shut down to conserve battery power. LED 140 may be programmed to remain on indefinitely until the user takes action to indicate the powered-on status of the device. Audio interface 174 is used to provide audible signals to and receive audible signals from the user. For example, audio interface 174 may be coupled to a speaker for providing audible output and to a microphone for receiving audible input, such as to facilitate a telephone conversation.

Embedded device 100 also includes a radio 172 that performs the function of transmitting and receiving radio frequency communications. Radio 172 facilitates wireless connectivity between the embedded device 100 and the outside world, via a communications carrier or service provider. Transmissions to and from the radio 172 are conducted under control of the operating system 164. In other words, communications received by the radio 172 may be disseminated to application programs 166 via the operating system 164, and vice versa.

The radio 172 allows the embedded device 100 to communicate with other computing devices, such as over a network. The radio 172 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
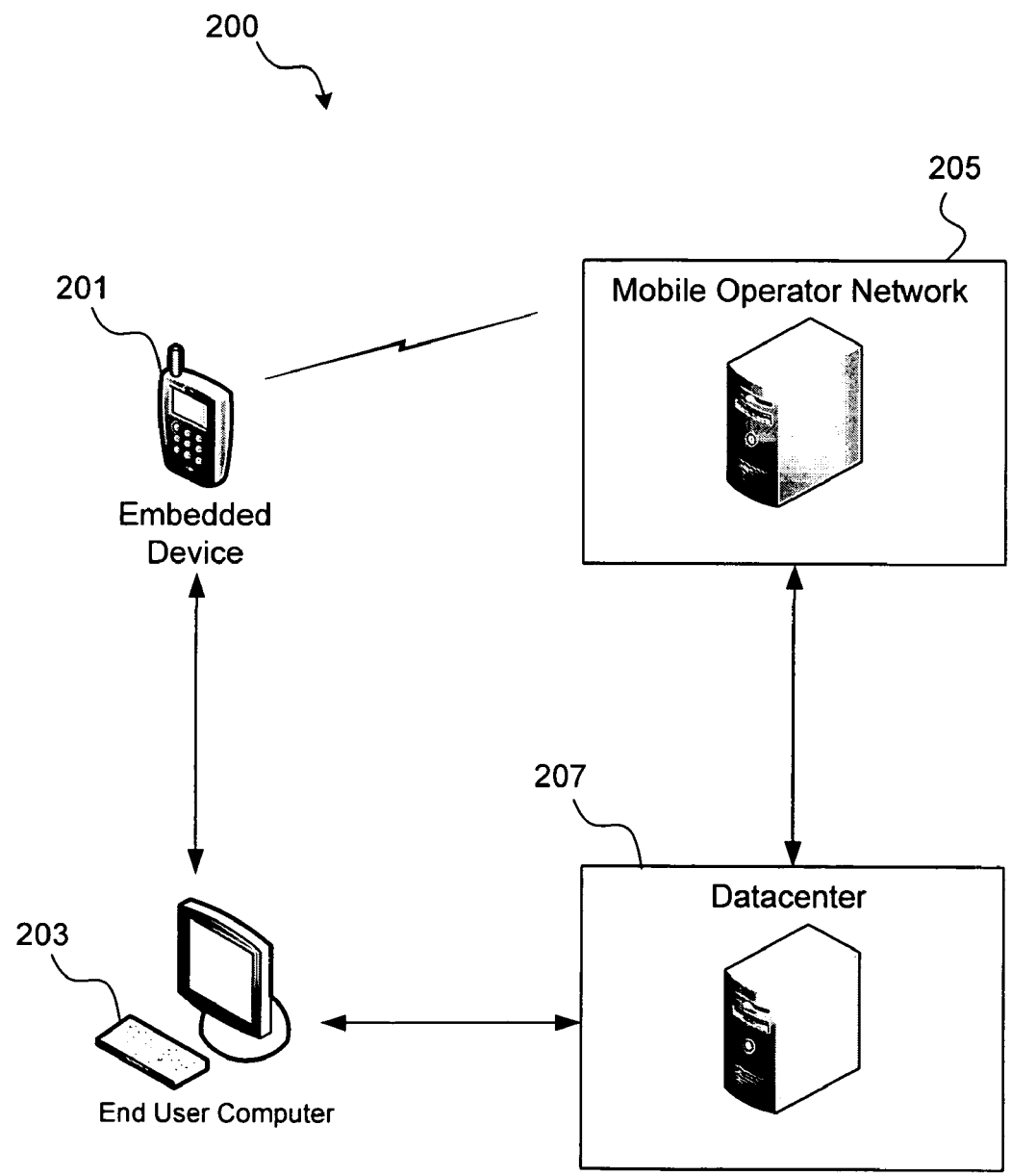
FIG. 2 is a block diagram illustrating a system for providing an image update to an embedded device according to an exemplary embodiment of the present invention.

FIG. 2 illustrates a system 200 for providing an image update to an embedded device, according to an exemplary embodiment of the present invention. In this embodiment, system 200 includes an embedded device 201, an end-user computer 203 (optional), a mobile operator network 205 and a datacenter 207.

In one embodiment, embedded device 201 is implemented as described above for embedded device 100 (FIG. 1).

End user computer 203 can be implemented using any suitable computer that can communicate with embedded device 201 via a link such as a USB interface, an IR interface, serial port, etc. to allow synchronization of data between end user computer 203 and embedded device 201. This synchronization data is typically persistent data used by applications such as email, media players, calendars, spreadsheets, text documents, etc. and is different from the updates for the OS of the embedded device. In addition, end user computer 203 can communicate with datacenter 207 via a network (e.g., the Internet).

Mobile operator network 205 is the entity that provides wireless communication services to be accessed using embedded device 201. For example, mobile operator network 205 can be provided and operated by a cellular telephone service provider such as, for example, Cingular, Verizon, Sprint or other mobile telephone operators that exist in many countries throughout the world. Mobile operator network 205 in this illustrated embodiment supports wireless data services such as SMS and GPRS as well as mobile telephone (voice) service to embedded devices. Mobile operator network 205 can also communicate via other networks (wired or wireless) such as, for example, the Internet. In some embodiments, mobile operator network 205 can communicate with datacenter 207 via the Internet.

Datacenter 207, in this embodiment, is a network that provides storage and access to data used by embedded devices and mobile operator networks for content, applications and application updates, etc. For example, datacenter 207 can store and provide access to ring tones, email settings, UI themes, applications updates and new applications for use in embedded devices via a network interface (e.g., an Internet connection).

In accordance with this embodiment of the invention, datacenter 207 can also store and provide access to information to update the operating systems of embedded devices. For example, OS update information can be uploaded and stored in datacenter 207 by the OS vendor via an Internet connection.

Datacenter 207 can then send embedded device 201 a message (e.g., a text message) that includes an address (e.g., a URL) of where updated OS information can be accessed. Datacenter 207 may send this message either after a request from embedded device 201 received via a wireless message or from the network connection via end user computer 203, or in response to a wireless message sent by datacenter 207 via mobile operator network 205. Embedded device 201 can then download the OS update information (e.g., an image of the updated OS or updated portion(s) of the OS) from datacenter 207 either wirelessly (e.g., a GPRS connection) or from the network connection via end user computer 203.

Figure 3:
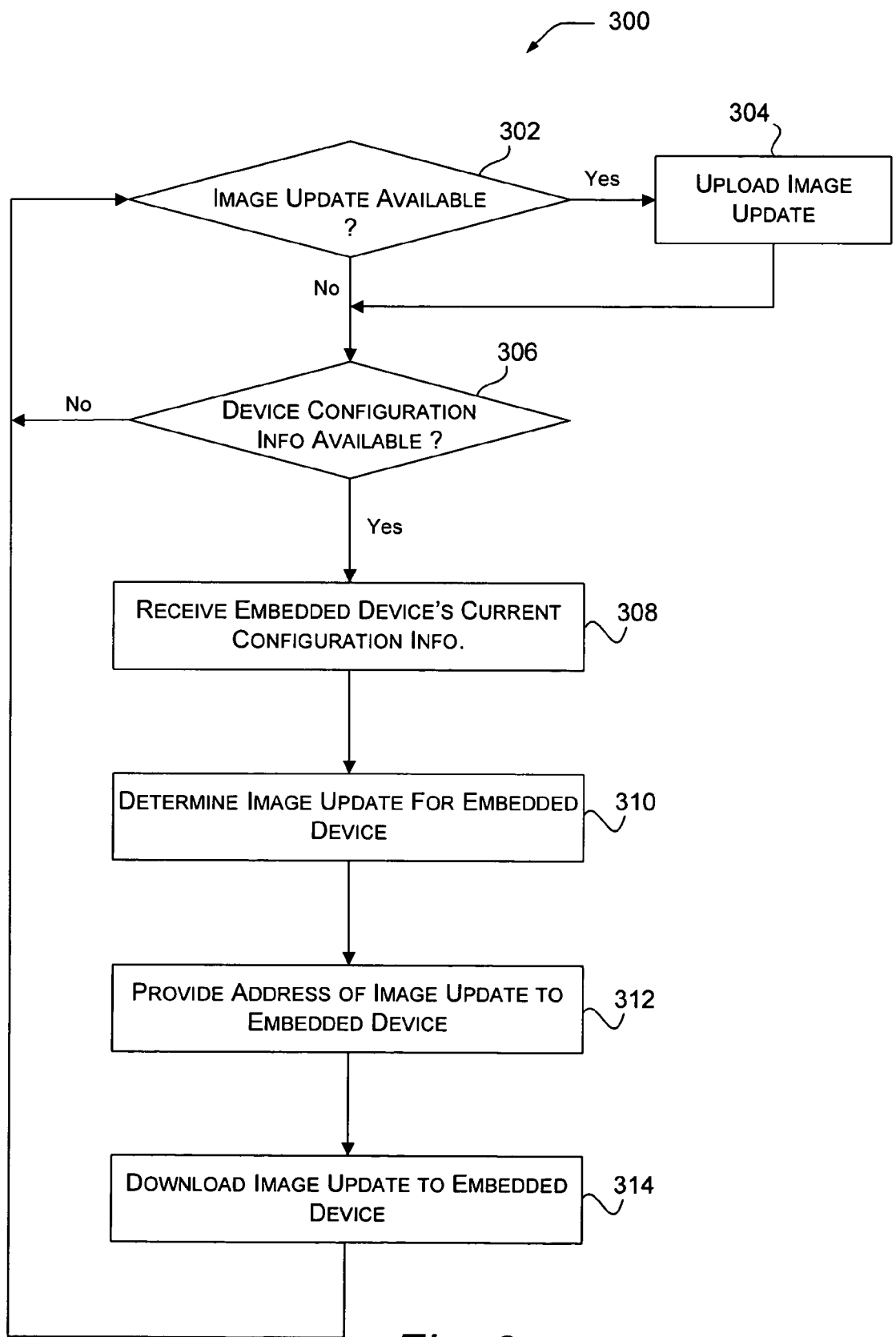
FIG. 3 is a flow diagram illustrating an operational flow in providing an image update to an embedded device, according to an exemplary embodiment of the present invention.

FIG. 3 illustrates an operational flow 300 in providing an image update to an embedded device, according to an exemplary embodiment of the present invention. Operational flow 300 may be performed in any suitable computing environment. For example, operational flow 300 may be executed by datacenter 207 of FIG. 2 and, therefore, the description of operational flow 300 may refer to at least one of the components of FIG. 2. However, any such reference to a component of FIG. 2 is for descriptive purposes only, and it is to be understood that the implementation of FIG. 2 is a non-limiting environment for operational flow 300.

At a decision block 302, the availability of an OS update (i.e., an image update) for an embedded device is determined. For example, in an embodiment using system 200, the vendor of the OS may signal datacenter 207 that a complete new version of the OS or patch to the OS is available for upload via a network connection such as the Internet.

If at decision block 302 it is determined that an update is available, at a block 304 the update is uploaded. For example, in an embodiment using system 200, the vendor can upload the update via a secure web service implemented by datacenter 207, which can also perform an authentication process to ensure that the update is provided by the true OS vendor. The operational flow then proceeds to a decision block 306, described below. In addition, if at decision block 302 it is determined that an update is not available, the operational flow also proceeds to decision block 306.

At decision block 306, the availability of configuration information (which includes the version of the OS) of the embedded device is determined. For example, in an embodiment using system 200, embedded device 201 can provide this configuration information to datacenter 207 via a wireless text message via mobile operator network 205 or via a network connection using end user computer 203. This message can include an identifier (e.g., a telephone number) of the embedded device as well as the version number of the embedded device's OS.

If at decision block 306 it is determined that the embedded device's configuration is not available, the operational flow returns to block 302. Otherwise, the operational flow proceeds to a block 308.

At block 308, the embedded device's configuration information is received. For example, in an embodiment using system 200, datacenter 207 receives this configuration information. As previously described, this configuration information includes the version of the OS and can be received via a text message (e.g., a SMS message) sent by embedded device 201. In other embodiments, embedded device 201 can send a message via a network connection (e.g., a HTTP request with the OS version included in the HTTP header).

At a block 310, an image update is determined for the embedded device. The image update is generated so that it will update the OS to the most recent version (or to a selected version) from the OS version currently stored in the embedded device. For example, in an embodiment using system 200, if the OS version currently stored in embedded device 201 is version 5.2 and the most recent version of the OS is version 5.4 (which results from the addition of the two most recent patches), then datacenter 207 can determine the image update for the embedded device must include the two most recent patches. Basically, in this embodiment datacenter 207 performs block 308 to determine what version OS is in embedded device 201, and then performs block 310 to determine what embedded device 201 needs to have an up-to-date OS.

At a block 312, an address of the image update determined at block 310 is provided to the embedded device. For example, in an embodiment using system 200, datacenter 207 stores the image update in a datastore and provides the address (e.g., a URL) at which the image update is stored. In one embodiment, datacenter 207 can provide the URL to embedded device 201 by sending a SMS message (that includes the URL) via mobile operator network 205.

At a block 314, the image update is downloaded to the embedded device. For example, in an embodiment using system 200, datacenter 207 downloads the image update via mobile operator network 205 using a GPRS connection in response to embedded device 201 sending a request for the data residing at the URL provided at block 312. In another embodiment, datacenter 207 can download the image update via an Internet connection in response to a HTTP request for the data residing at the URL.

Although the above operational flow is described sequentially, in other embodiments some operations may be performed in different orders or concurrently.

Figure 4:
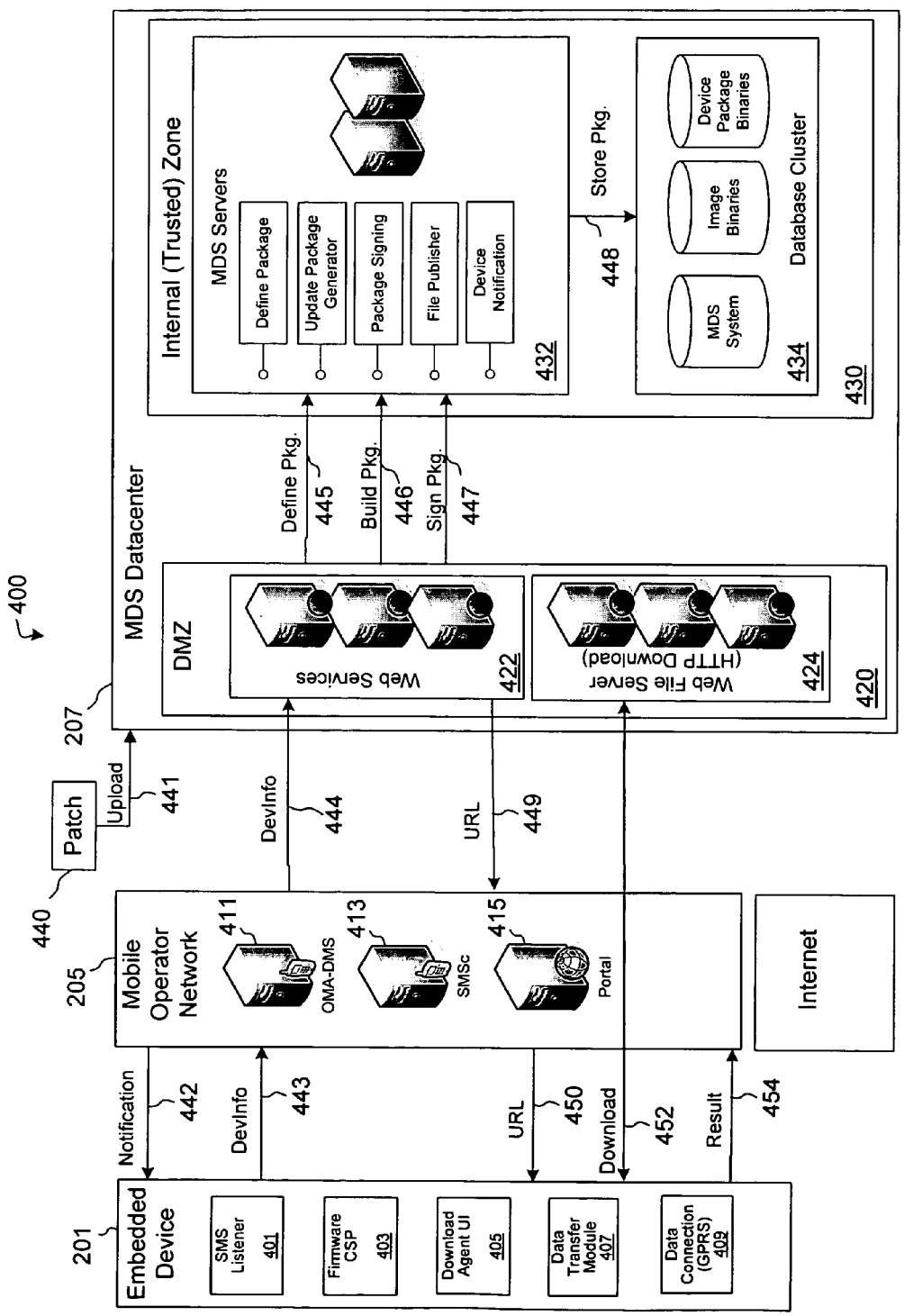
FIG. 4 is a block diagram illustrating an OMA SyncML-based system for providing an image update to an embedded device, according to an exemplary embodiment of the present invention.

FIG. 4 illustrates an OMA SyncML-based system 400 for providing an image update to an embedded device, according to an exemplary embodiment of the present invention. In this embodiment, system 400 provides an image update to embedded device 201 when initiated by datacenter 207.

In this embodiment of system 400, embedded device 201 includes a SMS listener 401, a firmware Configuration Service Provider (CSP) 403, a download agent UI 405, data transfer module (DTM) 407, and a wireless data connection interface 409 (also referred to herein as "data connection 409"). In this embodiment, data connection 409 is a GPRS connection, Firmware CSP 403 is an OMA SyncML client according to the OMA SyncML standard, and DTM 407 is a module of the OS that manages data transfers using GPRS so that the transfers are secure and authenticated despite interruptions in the transfer (which can be common in some scenarios).

Mobile operator network 205, in this embodiment, includes an OMA-DMS server 411, a SMS Center (SMSc) server 413, and an end user portal server 415. OMA-DMS server 411 conforms to the aforementioned OMA-DMS standard. SMSc server 413 and end user portal server 415 can be implemented using any suitable commercially available server components/software.

In this embodiment, datacenter 207 includes an untrusted or "DMZ" section 420 that includes a web services server(s) 422 (also referred to herein as "web services 422") and a web file server(s) 424 (also referred to herein as "web file server 424"), and is protected using one or more firewalls (not shown). This embodiment of datacenter 207 also includes an internal or trusted zone section 430 that includes metadata service (MDS) server(s) 432 (also referred to herein as "MDS server 432") and a database cluster 434 that stores MDS system information, image binary files, and package binary files generated for particular embedded devices based on their OS version information. In this embodiment, MDS server 432 exposes an application program interface (API) that allow MDS web services 422 and web file server 424 to initiate functions/operations by MDS server 432. Some of the functions (i.e., methods) of the MDS server API are described further below.

In one scenario, a patch 440 is uploaded to datacenter 207, as indicated by arrow 441. For example, the vendor of the OS of embedded device 201 can create and upload patch 440 using MDS web services supported by web services servers 422.

OMA-DMS server 411 of mobile operator network 205, which conforms with the OMA-DMS standards promulgated by the Open Mobile Alliance (OMA), sends a notification trigger to embedded device 201, as indicated by an arrow 442. In this embodiment, OMA-DMS server 411 on a fairly regular schedule sends notification triggers to embedded devices in its coverage area in accordance with the OMA-DMS standard. In particular, OMA-DMS server 411 causes SMS Center server 413 to send the notification trigger to embedded device 201 via a SMS message. This SMS message conforms to the OMA SyncML standard promulgated by the OMA.

Embedded device 201, in response to receiving the notification trigger, sends its configuration information to datacenter 207 as indicated by an arrow 443. In this embodiment, SMS listener 401 of embedded device 201 detects and receives the notification trigger. In response, SMS Listener 401 causes Firmware CSP 403 to send a DevInfo object (specified in the OMA SyncML standard) containing the OS version information to OMA-DMS server 411.

OMA-DMS server 411 then sends the DevInfo object to datacenter 207, as indicated by an arrow 444. In this embodiment, OMA-DMS server 411 makes a connection with MDS web services 422 of datacenter 207, and then sends the DevInfo object to MDS server 432 using MDS web services 422. In one embodiment, MDS web services 422 expose APIs that allow OMA-DMS server 411 to send the DevInfo object to MDS server 432, as well as perform other functions needed to support other data transfers.

In one embodiment, MDS server 432 then determines which update information is needed to update the OS of embedded device 201. In this embodiment, MDS web services 422 causes MDS server 432 to determine the update image needed by embedded device 201 by making a call to a Define Package method of the MDS server API, as indicated by an arrow 445. In one embodiment, the Define Package method compares the OS version information included in the DevInfo object with images information stored in database cluster 434 to determine which canonical and/or patch(es), if any, are missing from the embedded device's OS. As used herein, a canonical is an image of an entire OS version, as opposed to a patch that is added to an OS version. In this scenario, patch 440 was uploaded before OMA-DMS sent the notification trigger to embedded device 201, so an image update will be needed.

MDS server 432 then builds an update package to include any image binary file(s) defined by the Define Package method, as indicated by an arrow 446. In this embodiment, MDS web services 422 causes MDS server 432 to build the update package by making a call to an Update Package Generator method of the MDS server API. In one embodiment, the Update Package Generator method gets binary files from an image binaries datastore of database cluster 434 corresponding to the canonical and/or patch(es) defined when the Define Package method was called.

MDS server 432 then signs the package generated by the Update Package Generator method with an OEM or Operator certificate, as indicated by an arrow 447. In this embodiment, MDS web services 422 causes MDS server 432 to sign the package by making a call to a Package Signing method of the MDS server API. In one embodiment, the Package Signing method signs the package as described in the aforementioned U.S. Patent Application entitled "Secure Certificate Enrollment of Device Over a Cellular Network". This embodiment of the Package Signing method creates a token associating the token with identification information of embedded device 201 (e.g., the telephone number of the embedded device). In other embodiments, the package need not be signed.

MDS server 432 then stores the package and token in a device package datastore of database cluster 434, as indicated by an arrow 448. In this embodiment, MDS web services 422 causes MDS server 432 to store the package by making a call to an File Publisher method of the MDS server API, which returns to MDS web services 422 a URL for the location of the stored package.

MDS web services 422 then provides the URL of the stored package to OMA-DMS server 411, as indicated by an arrow 449. In this embodiment, MDS web services 422 sends the URL to OMA-DMS server 411 via a network connection.

OMA-DMS server 411 then sends the URL to the embedded device via an SMS message, as indicated by an arrow 450. In this embodiment, the message is a User Confirm Alert according to the aforementioned OMA SyncML standard, and the URL contains the token created by the aforementioned Package Signing method. The embedded device can receive the User Confirm Alert via SMS listener 401.

In response to receiving the User Confirm Alert, embedded device 201 notifies the user of the new update, which the user can then accept. For example, the notification can be provided via download agent UI 405. If the user accepts the update, embedded device 201 can download the image update (i.e., the stored binary package) using DTM 407 and data connection 409. In other embodiments, embedded device 201 can be connected to end user computer 203 (FIG. 2) and download the image update through an Internet connection to web file server 424. Embedded device 201 can then install the downloaded image update using firmware CSP 403.

After the installation process, embedded device 201 then sends a SMS message to OMA-DMS server 411 indicating the result of the installation process, as indicated by an arrow 454. In this embodiment, the message is a final result Alert according to the aforementioned OMA SyncML standard.

Figure 5:
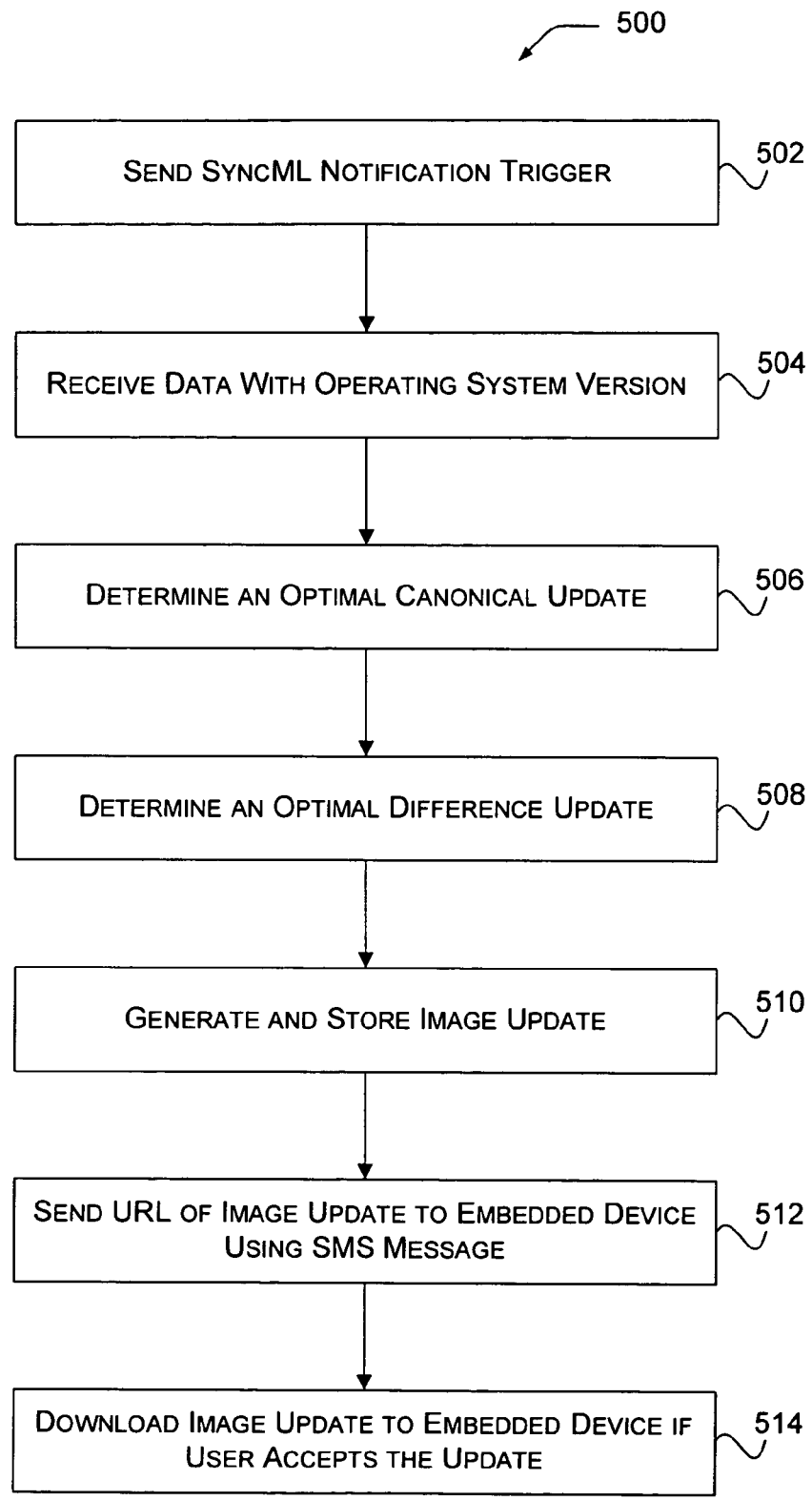
FIG. 5 is a flow diagram illustrating an OMA SyncML-based operational flow in providing an image update to an embedded device, according to an exemplary embodiment of the present invention.

FIG. 5 illustrates an OMA SyncML-based operational flow 500 in providing an image update to an embedded device, according to an exemplary embodiment of the present invention. Operational flow 500 may be performed in any suitable computing environment. For example, parts of operational flow 500 may be executed by mobile operator network 205 or datacenter 207 of FIG. 4 and, therefore, the description of operational flow 500 may refer to at least one of the components of FIG. 4. However, any such reference to a component of FIG. 4 is for descriptive purposes only, and it is to be understood that the implementation of FIG. 4 is a non-limiting environment for operational flow 500.

At a block 502, an OMA SyncML notification trigger is sent to an embedded device. In one embodiment, a mobile operator network sends a text message to the embedded device that causes the embedded device to reply with its OS version information. For example, OMA-DMS 411 (FIG. 4) causes SMSc server 413 (FIG. 4) to send the notification trigger to embedded device 201 via a SMS message that conforms to the OMA SyncML standard promulgated by the OMA. In this embodiment, the rest of operational flow 500 is performed by a datacenter such as datacenter 207 of FIG. 4.

At a block 504, information regarding the OS version residing on the embedded device is received from the embedded device. In one embodiment, the datacenter receives the OS version information from the embedded device via the mobile operator network. For example, in an embodiment using system 400, embedded device 201, in response to receiving the notification trigger, sends its configuration information to datacenter 207 via OMA-DMS 411. More particularly, OMA-DMS server 411 makes a connection with MDS web services 422, and then sends the aforementioned DevInfo object to MDS server 432 using MDS web services 422.

The datacenter then determines the image update needed by the embedded device by comparing the received OS version information with the most recent OS update(s). Alternatively, the embedded device may include information requesting specific OS update. In one embodiment, the datacenter determines the image update using a two-step process as indicated by blocks 506 and 508 in which canonical and difference updates are determined. As previously described, a canonical update corresponds to an entire OS image rather than a portion of an OS image. In this embodiment, canonical and difference updates are stored by the datacenter. For example, the datastore of canonical and difference updates can be implemented in the image binaries database of database cluster 434 (FIG. 4). An example datastore is shown in FIG. 6, with canonical updates 602 including version 3, version 5 and version 6, and difference updates 604 including patches that update an OS from version 1 to version 3, version 2 to version 4, version 3 to version 8, version 4 to version 5, version 5 to version 6, version 6 to version 7, and version 7 to version 8. In this example, the most recent OS version is version 8.

Returning to FIG. 5, at block 506, the datacenter determines an optimal canonical update based on the received OS version information and the desired OS version. If, for example, the embedded device has OS version 2 and the most recent OS version is desired (i.e., version 8 in this example), the version 3 canonical is an optimal selection because then the difference update from version 3 to version 8 can be used to form the most recent version of the OS. In contrast, if the version 6 canonical were selected, then two difference updates (i.e., version 6 to version 7, and version 7 to version 8) must be used to form version 8 of the OS.

At block 508, the datacenter then determines an optimal difference update based on the canonical selected at block 506 and the desired OS version. Using the example described above for block 506, because the version 3 canonical was selected at block 506, the datacenter would then select difference update from version 3 to version 8. For example, in an embodiment using system 400, MDS web services 422 causes MDS server 432 to determine the update image needed by embedded device 201 by making a call to a Define Package method of the MDS server API.

At a block 510, the datacenter generates and stores an image update package based on the update determined at blocks 506 and 508. The stored image update package can be signed. For example, in an embodiment using system 400, MDS server 432 builds an update package to include any image binary file(s) defined by the Define Package method. MDS web services 422 causes MDS server 432 to build the update package by making a call to the Update Package Generator method, which gets binary files from the image binaries datastore of database cluster 434. MDS server 432 then stores the package in the device package datastore of database cluster 434 by making a call to the File Publisher method, which returns to MDS web services 422 a URL for the location of the stored package.

At a block 512, the datacenter sends an address of the stored package to the embedded device. In one embodiment, the datacenter sends a text message with a URL of the stored package via the mobile operator network. For example, in an embodiment using system 400, MDS web services 422 provides the URL of the stored package to OMA-DMS server 411, which then sends the URL to the embedded device via an SMS message. In one embodiment, the SMS message is a User Confirm Alert according to the aforementioned OMA SyncML standard, and the URL contains the token created by the aforementioned Package Signing method.

At a block 514, the datacenter then downloads the image update if the user of the embedded device accepts the update. In one embodiment, the user can send the datacenter a text message accepting the update via the mobile operator network. The datacenter can then download the image update to the embedded device using a GPRS connection. For example, in an embodiment using system 400, embedded device 201 notifies the user of the new update in response to the User Confirm Alert, which the user can then accept. If the user accepts the update, embedded device 201 can download the image update (i.e., the stored binary package) using DTM 407 and data connection 409. In other embodiments, embedded device 201 can be connected to end user computer 203 (FIG. 2) and download the image update through an Internet connection to web file server 424.

Although the above operational flow is described sequentially, in other embodiments some operations may be performed in different orders or concurrently.

FIG. 7 illustrates a data structure 700 for storing updates, according to an exemplary embodiment of the present invention. For example, data structure 700 can be used to store image updates in the image binary files datastore of database cluster 434 (FIG. 4). In this embodiment, data structure 700 is incorporated into a database so that update information may be searched. In one embodiment, the database is a structured query language (SQL)-based database that can perform queries on XML fields. Data structure 700, in this embodiment, is part of a table with two columns, namely an ID column 702 and a metadata column 704. ID column 702 includes the universally unique identifier (UUID) for each update (either canonical or difference). Metadata column 704 includes XML metadata for the update. This XML metadata includes a field named extended metadata. This extended metadata field is used to store metadata that specifies relationships between the update and other updates in the database. In this way, MDS server 432 (FIG. 4) can generate an optimal image update package by performing queries on the stored image update information to find and compare relationships between canonical and difference updates.

Figure 8:
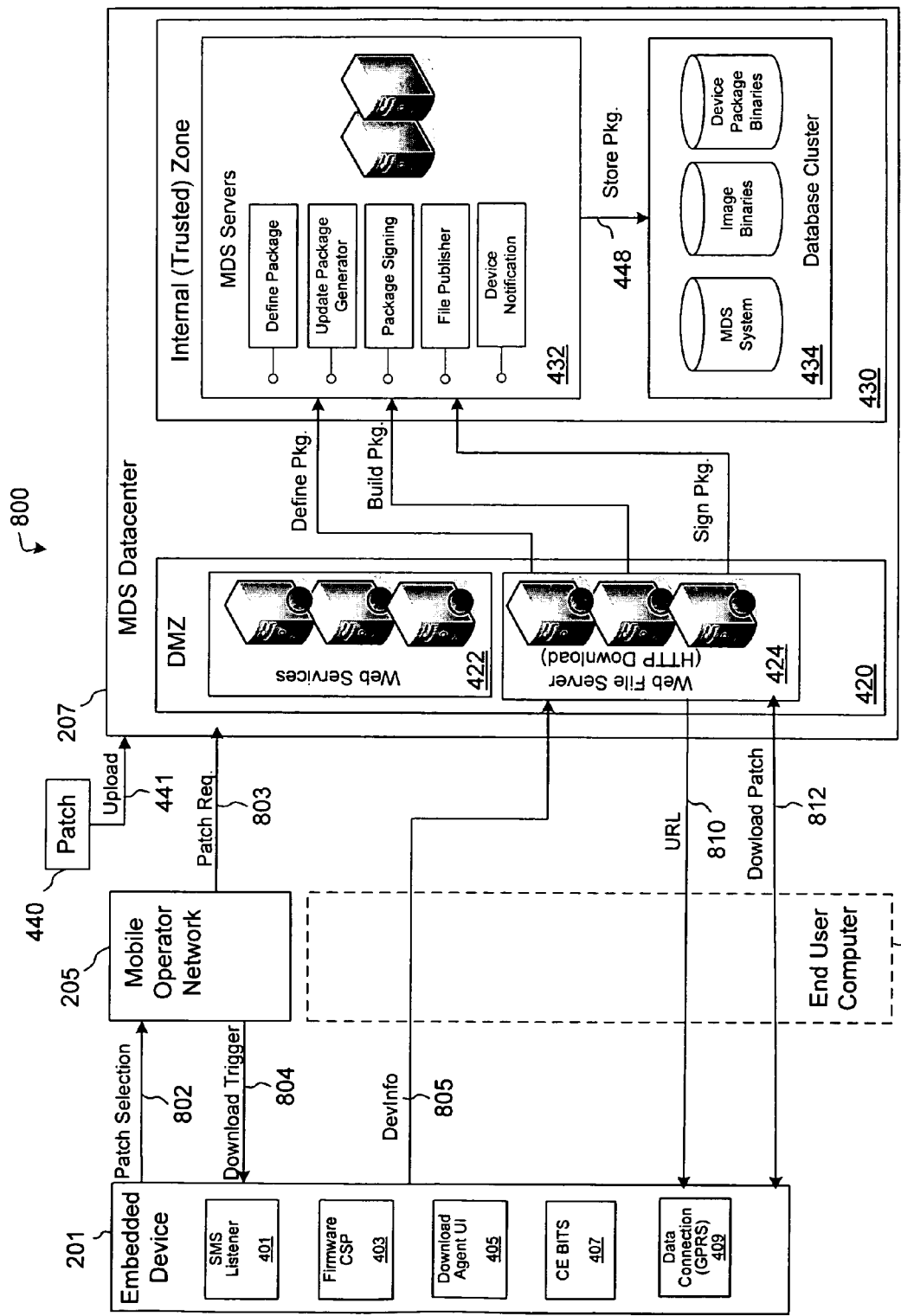
FIG. 8 is a block diagram illustrating an Internet-based system for providing an image update to an embedded device, according to an exemplary embodiment of the present invention.

FIG. 8 illustrates an Internet-based system 800 for providing an image update to an embedded device, according to an exemplary embodiment of the present invention. In this embodiment, system 800 provides an image update to embedded device 201 when initiated by the embedded device's user.

In this embodiment of system 800, embedded device 201 is substantially similar to the embedded device described above in conjunction with FIG. 4. In addition, this embodiment of embedded device 201 includes an interface to a computer (not shown) such as end user computer 203 (FIG. 2), which in turn can form a connection with datacenter 207. In this embodiment, the connection between the computer and the datacenter is the Internet.

In one scenario, patch 440 is uploaded to datacenter 207, as indicated by arrow 441. This operation is substantially similar to the patch upload operation described above in conjunction with FIG. 4.

In this scenario, embedded device 201 selects an update by accessing portal 415 (FIG. 4) of mobile operator network 205, as indicated by an arrow 803. The user can request updates independently of whether a new patch is uploaded to datacenter 207, but in this scenario the patch is uploaded before the user's selection to illustrate the entire update process.

Mobile operator network 205 then sends a patch request to datacenter 207 as indicated by an arrow 803. In one embodiment, portal 415 sends the patch request to web services 422. In addition, mobile operator network 205 sends a download trigger message to embedded device 201, as indicated by an arrow 804. In one embodiment, the download trigger message is an SMS message.

In response to the download trigger, in this embodiment embedded device 201 sends information related to its OS version to datacenter 207, as indicated by an arrow 805. In one embodiment, the OS version information is included in a message sent to web file server 424 via the Internet. In some embodiments, the OS version information is included in a DevInfo object, substantially similar to the DevInfo object described above in conjunction with FIG. 4, except that the DevInfo object is included in the HTTP header of the message.

Web file server 424 then sends the DevInfo object to MDS server 432. In one embodiment, MDS server 432 then determines which update information is needed to update the OS of embedded device 201. In this embodiment, MDS web services 422 causes MDS server 432 to: (a) determine the update image requested by embedded device 201, (b) build an update package, (c) sign the update package, and (c) store the update package in database cluster 434 by making calls to the Define Package method, the Update Package Generator method, the Package Signing method, and the File Publisher method as previously described for system 400.

Web file server 424 then provides the URL of the stored package to embedded device 201 via the Internet, as indicated by an arrow 810. In response, embedded device 201 notifies the user of the new update, which the user can then accept. For example, the notification can be provided via download agent UI 405. If the user accepts the update, embedded device 201 can download the image update (i.e., the stored binary package) via the Internet. Embedded device 201 can then install the downloaded image update using firmware CSP 403.

Illustrative Operating Environment

Figure 9:
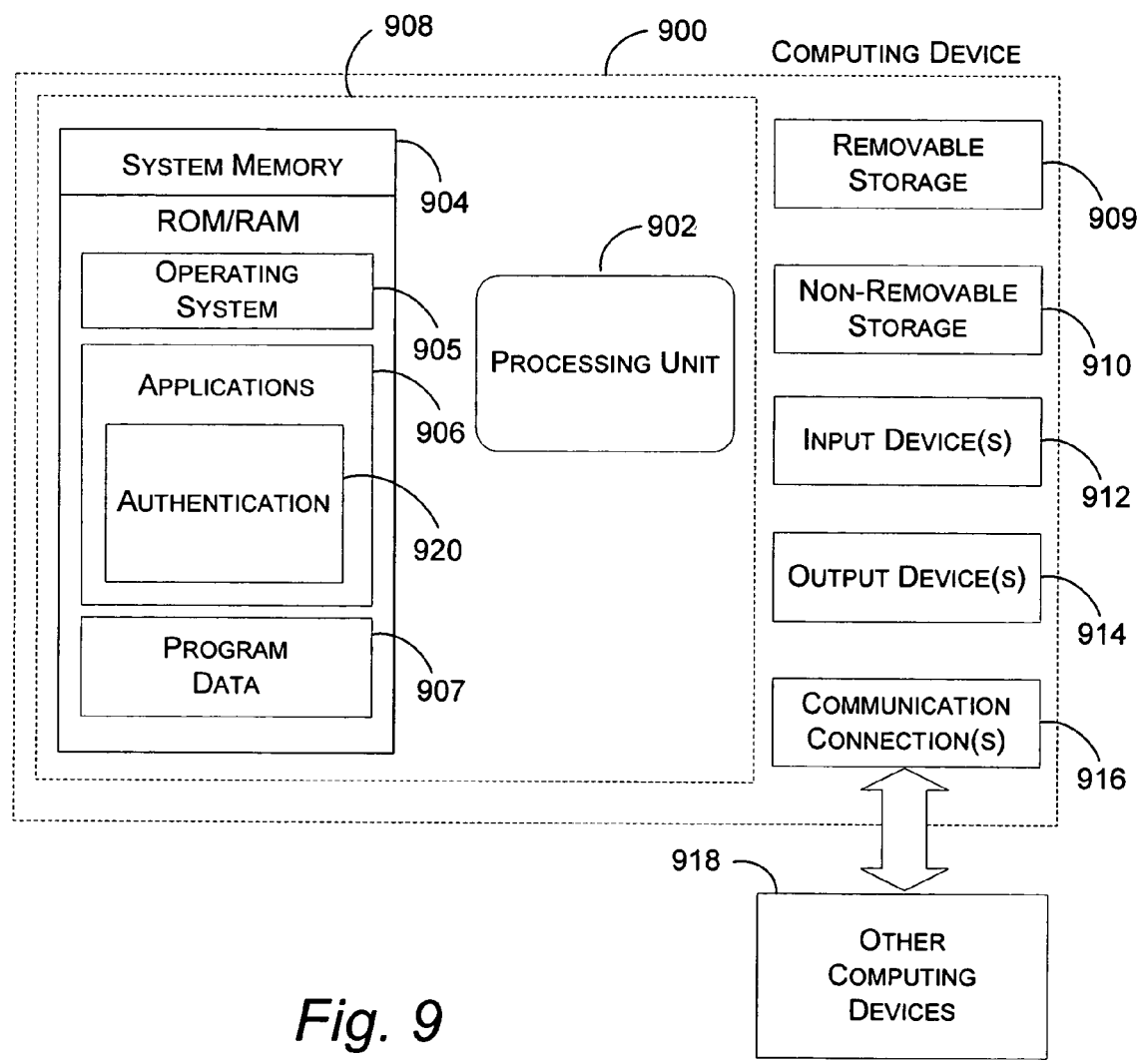
FIG. 9 illustrates an exemplary computing environment that may be used according to exemplary embodiments of the present invention.

With reference to FIG. 9, one exemplary system for implementing the invention includes a computing device, such as computing device 900. Computing device 900 may be configured as a client, a server, mobile device, or any other computing device. In a very basic configuration, computing device 900 typically includes at least one processing unit 902 and system memory 904. Depending on the exact configuration and type of computing device, system memory 904 may be volatile (such as RAM), non-volatile (such as ROM, flash memory, etc.) or some combination of the two. System memory 904 typically includes an operating system 905, one or more applications 906, and may include program data 907. In one embodiment, application 906 includes an authentication application 920. This basic configuration is illustrated in FIG. 9 by those components within dashed line 908.

Computing device 900 may have additional features or functionality. For example, computing device 900 may also include additional data storage devices (removable and/or non-removable) such as, for example, magnetic disks, optical disks, or tape. Such additional storage is illustrated in FIG. 9 by removable storage 909 and non-removable storage 910. Computer storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media may be part of device 900. Computing device 900 may also have input device(s) 912 such as keyboard, mouse, pen, voice input device, touch input device, etc. Output device(s) 914 such as a display, speakers, printer, etc. may also be included.

Computing device 900 also contains communication connections 916 that allow the device to communicate with other computing devices 918, such as over a network. Communication connection 916 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for updating an operating system (OS) of a mobile device, the method comprising:

receiving, on a metadata service server, an OS version identifier of a current OS of the mobile device, wherein the OS version identifier is received via a mobile operator network;

causing the metadata service server to call a define package method, wherein the define package method determines a difference between the current OS indicated by the received OS version identifier and an updated OS associated with update tables in image binary files of a data center, wherein the image update tables include canonical update identifiers that indicate entire versions of an operating system, difference update identifiers that indicate patches of the operating system, and markup-language metadata that specifies a relationship between the canonical updates and the difference updates;

based on the difference determined by the define package method, identifying an optimal canonical update version for the current OS and the updated OS, an optimal difference update for the current OS and the updated OS, and a relationship between the optimal canonical update version and the optimal difference update;

based on the identification, building, on the metadata service server, an image update package for the mobile device, wherein the image update package includes the optimal canonical update version and the optimal difference update based on the relationship between the optimal canonical update version and the optimal difference update;

storing the image update package in a device package data store of the metadata service server, wherein the image update package is indicated by an address; and sending the address from the metadata service server to the mobile device to facilitate subsequent retrieval of the image update package by the mobile device.

2. The computer-implemented method of claim 1, wherein prior to receiving the OS version identifier, the metadata service server exposes an application programming interface to the mobile operator network to obtain the OS version identifier.

3. The computer-implemented method of claim 1, wherein storing the image update package in a device package data store of the metadata service server includes generating a token for the mobile device and storing the token with the generated image version package.

4. The computer-implemented method of claim 3, wherein the address is a uniform resource locator, wherein the metadata service server sends the uniform resource locator to the mobile operator network for subsequent transmittal to the mobile device.

5. The computer-implemented method of claim 4, wherein after sending the address from the metadata service server to the mobile device to facilitate subsequent retrieval of the image update package by the mobile device, the metadata service server sends the package in response to a request from the mobile device via a webfile server of the metadata service server.

6. The computer-implemented method of claim 5, wherein sending the package includes a global packet radio service connection.

7. A computer-readable storage medium having computer executable instructions for updating an operating system (OS) of a mobile device, the instructions comprising:

receiving, on metadata service server, an OS version identifier of a current OS of the mobile device, wherein the OS version identifier is received via a mobile operator network;

causing the metadata service server to call a define package method, wherein the define package method determines a difference between the current OS indicated by the received OS version identifier and an updated OS associated with update tables in image binary files of a data center, wherein the update tables include canonical update identifiers that indicate entire versions of an operating system difference update identifiers that indicate patches of the operating system, and markup-language metadata that specifies a relationship between the canonical updates and the difference updates;

based on the difference determined by the define package method, identifying an optimal canonical update version of the current OS and the updated OS, an optimal difference update of the current OS and the updated OS, and a relationship between the optimal canonical update version and the optimal difference update;

based on the identification, building, on the metadata service server, an image update package for the mobile device wherein the image update package includes the optimal canonical update version and the optimal difference update based on the relationship between the optimal canonical update version and the optimal difference update;

storing the image update package in a device package data store of the metadata service server, wherein the image update package is indicated by an address; and sending the address from the metadata service server to the mobile device to facilitate subsequent retrieval of the image update package by the mobile device.

8. The computer-readable storage medium of claim 7, wherein prior to receiving the OS version identifier, the metadata service server exposes an application programming interface to the mobile operator network to obtain the OS version identifier.

9. The computer-readable storage medium of claim 7, wherein storing the image update package in a device package data store of the metadata service server includes generating a token for the mobile device and storing the token with the generated image version package.

10. The computer-readable storage medium of claim 7, wherein the address is a uniform resource locator, wherein the metadata service server sends the uniform resource locator to the mobile operator network for subsequent transmittal to the mobile device.

11. The computer-readable storage medium of claim 7, wherein after sending the address from the metadata service server to the mobile device to facilitate subsequent retrieval of the image update package by the mobile device, the metadata service server sends the package in response to a request from the mobile device via a webfile server of the metadata service server.

12. The computer-readable storage medium of claim 11, wherein sending the package includes a global packet radio service connection.

13. A system for updating an operating system (OS) of a mobile device, the system comprising:

a processor; and a memory having computer executable instructions stored thereon, wherein the computer executable instructions are configured for:

receiving, on metadata service server, an OS version identifier of a current OS of the mobile device, wherein the OS version identifier is received via a mobile operator network;

causing the metadata service server to call a define package method, wherein the define package method determines a difference between the current OS indicated by the received OS version identifier and an updated OS associated with update tables in image binary files of a data center, wherein the image update tables include canonical update identifiers that indicate entire versions of an operating system, difference update identifiers that indicate patches of the operating system, and markup-language metadata that specifies a relationship between the canonical updates and the difference updates;

based on the difference determined by the define package method, identifying an optimal canonical update version for the current OS and the updated OS, an optimal difference update for the current OS and the updated OS, and a relationship between the optimal canonical update version and the optimal difference update;

based on the identification, building, on the metadata service server, an image update package for the mobile device, wherein the image update package includes the optimal canonical update version and the optimal difference update base on the relationship between the optimal canonical update version and the optimal difference update;

storing the image update package in a device package data store of the metadata service server, wherein the image update package is indicated by an address; and sending the address from the metadata service server to the mobile device to facilitate subsequent retrieval of the image update package by the mobile device.

14. The system of claim 13, wherein prior to receiving the OS version identifier, the metadata service server exposes an application programming interface to the mobile operator network to obtain the OS version identifier.

15. The system of claim 13, wherein storing the image update package in a device package data store of the metadata service server includes generating a token for the mobile device and storing the token with the generated image version package.

16. The system of claim 13, wherein the address is a uniform resource locator, wherein the metadata service server sends the uniform resource locator to the mobile operator network for subsequent transmittal to the mobile device.

* * * * *

UNITED STATES PATENT AND TRADEMARK OFFICE
CERTIFICATE OF CORRECTION

PATENT NO. : 7,716,661 B2
APPLICATION NO. : 11/082441
DATED : May 11, 2010
INVENTOR(S) : Jeffrey Michael Paul et al.

Page 1 of 1

It is certified that error appears in the above-identified patent and that said Letters Patent is hereby corrected as shown below:

In column 16, line 3, in Claim 13, delete "base" and insert -- based --, therefore.

Signed and Sealed this
Eighth Day of February, 2011

David J. Kappos
*Director of the United States Patent and Trademark Office*